United States Patent

[11] 3,617,112

| [72] | Inventors | Joachim Eggert<br>Braunschweig;<br>Karl-Heinrich Behrens, Uflingen, both of Germany |
|---|---|---|
| [21] | Appl. No. | 832,243 |
| [22] | Filed | June 11, 1969 |
| [45] | Patented | Nov. 2, 1971 |
| [73] | Assignee | Voigtländer, A.G. |
| [32] | Priority | June 14, 1968 |
| [33] | | Switzerland |
| [31] | | 8893/68 |

[54] PHOTOGRAPHIC OBJECTIVE HAVING A REAR DIAPHRAGM
2 Claims, 2 Drawing Figs.

[52] U.S. Cl. ................................................ 350/225, 350/206, 350/230
[51] Int. Cl. ............................................... G02b 9/12
[50] Field of Search .......................................... 350/206, 225, 230

[56] References Cited
UNITED STATES PATENTS

| 3,511,558 | 5/1970 | Uberhagen .................... | 350/206 X |
| 1,643,865 | 9/1927 | Weidert ........................ | 350/206 |
| 1,668,030 | 5/1928 | Albada ......................... | 350/230 |
| 2,625,856 | 1/1953 | Muller .......................... | 350/206 |

FOREIGN PATENTS

| 645,202 | 4/1937 | Germany ..................... | 350/230 |

*Primary Examiner*—David Schonberg
*Assistant Examiner*—Paul A. Sacher
*Attorney*—Blum, Moscovitz, Friedman & Kaplan ABSTRACT: A photographic objective having a rear diaphragm. In front of the rear diaphragm there are a pair of meniscus-shaped components respectively having convex surfaces directed toward each other with one of these components being made up of a pair of individual lenses while the other is composed of a single lens. The three lenses provide the objective with a biconcave configuration. The concave front surface of the front meniscus and the opposite surface thereof have radii provided with an arithmetic sum the absolute value of which is smaller than 1.0 but no less than 0.6 times the focal length of the entire objective, while the absolute value of the difference between these radii is no smaller than o without exceeding a limiting value of 0.15 times the focal length of the entire objective. The radius of the concave front objective surface divided by the radius of the following convex forwardly directed surface has an absolute value greater than 1.10 without exceeding a limiting value of 2.10.

PHOTOGRAPHIC OBJECTIVE HAVING A REAR DIAPHRAGM

BACKGROUND OF THE INVENTION

The present invention relates to a photographic objective having a rear diaphragm and composed of a pair of meniscus-shaped components respectively having convex exterior surfaces directed toward each other. One of these components is made of a pair of individual lenses, one of which is positive and other other of which is negative, and these lenses may be cemented to each other as well as enclosing a small air gap between themselves, if desired.

Thus, the objective of individual invention is made up of a combination of an individual meniscus lens and a meniscus-shaped doublet, forming in their entirety three lenses which in a direction toward the longer conjugate as well as in a direction toward the shorter conjugate and thus toward the rear diaphragm respectively have concave exterior end surfaces, so that the entire objective is of biconcave configuration. Thus, the pair of meniscuses will enclose between themselves an air gap of biconcave configuration.

Such objectives are provided to be used with an initial relative aperture which is between 1:5.5 and 1:8.8, while having a useful viewing field which can be extended from approximately 35° up to 50°. By situating the diaphragm to the rear of the entire objective, an important advantage is achieved in that with respect to a combination with an adjustable aperture for the diaphragm and the photographic shutter all of the desired freedom is available, so that such an objective is preferred for picture-taking objectives for cameras having automatic exposure controls.

A double meniscus objective which in appearance seems similar to the form of the new objective of the present invention is disclosed in German Pat. No. 645,202. In spite of the outer apparent similarity, this older objective (Example 3, FIG. 3 of German Pat. No. 645,202) at its inner construction as well as in the manner in which it operates optically is completely different from the present invention since is is constructed as a partly symmetrical objective where the inner airspace between the pair of meniscus-shaped components forms the central diaphragm chamber which in addition is limited by at least one aspherical surface.

This aspherical surface operates to correct the aperture errors not only for the central bundle of rays which travel parallel to the optical axis but also for the bundle of rays which are inclined to the optical axis, while the correction for astigmatism, curvature and distortion is provided by the form of the double objective, since because of the low impingement of the primary ray at the aspherical surface limiting the central diaphragm chamber, the latter aspherical surface coacts primarily with the central part of the lens surfaces at the crest thereof through which the optical axis passes, so that no appreciable result is available in connection with surface deformation.

SUMMARY OF THE INVENTION

It is accordingly a primary objective of the present invention to provide an objective which will avoid the above drawbacks, In particular it is an object of the invention to provide an objective which has a rear diaphragm and which at the same time will be capable of achieving outstanding results, avoiding the drawbacks of known objectives of this general type.

In strict contrast to older proposals, the objective of the present invention has at the side of the shorter conjugate a rear diaphragm which is thus situated at the image chamber so that with respect to the location of the diaphragm the construction of the invention is completely unsymmetrical. For this reason, the corrective action of the lenses, which act to make corrections of all image errors throughout their entire diameters, is also different. Moreover, with double-objectives having inner diaphragms it is not possible to make use of the technical advances achieved by the present invention.

Thus, with the objective of the invention there is provided, as set forth in detail below, by way of the simplest technical expedient a good utility of the imaging capacity while maintaining the greatest possible freedom for further constructive features. It is to be emphasized that the objective includes a front meniscus having a concave forwardly directed surface which results not only in a substantial improvement of the situation and course of both astigmatic image surfaces, but in addition with these features the characteristics requirements of the structure of the invention result in an additional substantial improvement of the distortion condition, which, as is well-known, with lens assemblies having a rear diaphragm is a source of substantial problems.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
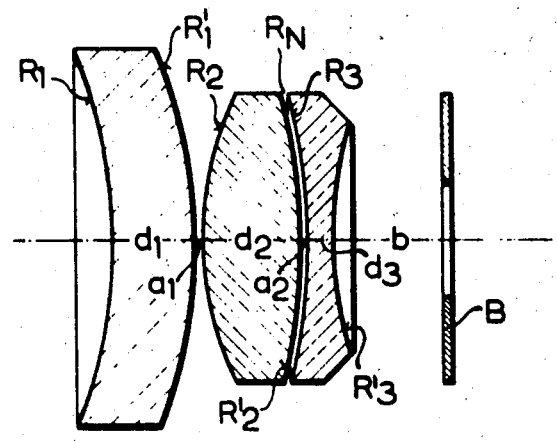
FIG. 1 is a schematic representation of one embodiment of an objective of the invention.

In correspondence with the series of requirements for the objective of the present invention, the objective includes a front meniscus having a concave front surface directed toward the longer conjugate and having at its exterior end surfaces, which are in engagement with air, radii the absolute value of the arithmetic sum of which is smaller than $1.0 f$, without however being less than a lower limiting value of $0.60 f$, while at the same time the absolute value of the difference between these radii is equal to or greater than 0, without however exceeding an upper limiting value of $0.15 f$, where $f$ is the focal length of the entire objective. At the same time the quotient resulting from dividing the front radius $R_1$ by the radius $R_2$ of the front surface of the rear meniscus component, which is positive and directed toward the shorter conjugate, has an absolute value greater than $1.10 f$, without, however, exceeding an upper limiting value of $2.10 f$.

In formula form these three relationships are as follows:

a. $1.0 f > |R'_1 + R_1| > 0.6 f$
b. $0 \leq |R'_1 - R_1| < 0.15 f$
C. $1.10 < |R_1 : R_2| < 2.10$ Furthermore, it is of advantage to provide for the lens refractive power of the biconcave air lens which follows the front meniscus a value where the sum of the surface refractive powers for the rear surface of the front meniscus, which has the radius $R'_1$, and the front surface of the following doublet, which has a radius $R_2$, is 2.5 times the refractive power $\Phi$ of the entire objective while remaining smaller than 4.0 times this latter refractive power, so that in formula form:

d. $2.5 < \Phi_a < 4.0 \Phi$ .... (2)

with $\varphi_1' + \varphi_2 = \varphi_a$ as this lens refractive power of the airgap situated between these components. In order to achieve an optimum corrective action, it has been found that the axial thickness $d_1$ of the front meniscus should be of such a magnitude that its value is greater than $0.05 f$ without however exceeding a value of $0.20 f$. In formula form:

e. $0.05 f > d_1 < 0.20 f$.

A multiple lens objective of this general type, which in contrast with the lens assembly of German Pat. No. 645,202 is also provided with a rear diaphragm, is known according to British Pat. No. 487,712/1938. This six-lens or seven-lens objective assembly is provided as a wide-angle system. In contrast, the extremely simple objectives of the present invention all represent a sharp distinction with respect to this complicated assembly, which requires not only a large costly lens assembly to solve the particular problem, but which in addition is based upon a completely different principle of construction from the present invention and as a result has with respect to the present invention completely opposed dimension requirements which cannot be compared with those of the present invention.

With the simple objective of the invention, which is composed in its entirety of nondeformed exclusively spherical surfaces, and which has one meniscus component made up of a pair of lenses, one of which is positive and the other of which is negative, has details as set forth in the following data tables.

In construction of FIG. 1 the meniscus which is adjacent the diaphragm B is in the form of a doublet, having a pair of lenses one of which is positive and the other of which is negative, while at the side of the longer conjugate there is a single meniscus lens.

Figure 2:
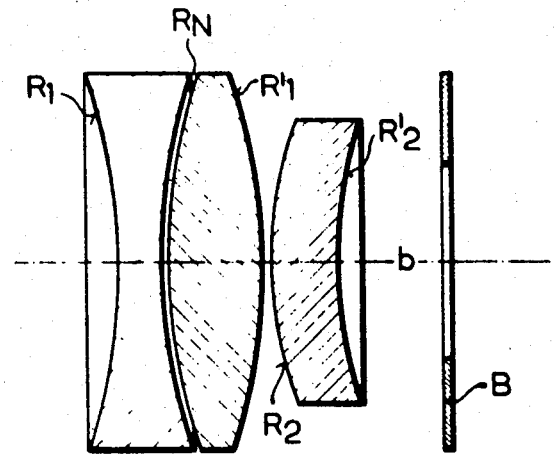
FIG. 2 is a schematic representation of another embodiment of an objective according to the invention.

In the embodiment of FIG. 2, there is directed toward the longer conjugate a meniscus which is composed of a pair of lenses one of which is positive and the other of which is negative, while adjacent the rear diaphragm B there is a meniscus made up of single positive lens which has a concave surface directed toward the diaphragm. The details of the structure referred to in the following tables have corresponding designations in FIG. 1.

The designations of the radii of curvature R as well as the lens thicknesses $d$ and air distances $a$ along the optical axis of the figures correspond to those presented in the data tables. The pair of adjoining surfaces of the meniscus doublet lenses are designated $R_N$, while the glass which is used is characterized by the refractive index of the yellow $d$-line of the helium spectrum ($nd$) and their color dispersion by the Abbe number ($v$). The rear diaphragm B has a distance B from the rear surface of radius $R_3'$ in FIG. 1 and $R_1'$ in FIG. 2. The data tables and all of the rest of the corresponding lengths are with respect to a unit focal length of $f=100$ mm. corresponding to an equivalent refractive power $\Phi=10.0$ diopters.

EXAMPLE 1 (FIG. 1)

| Radius | $f=100$ mm. Thickness and Air Distance | Aperture 1:6.8 nd/$v$ |
|---|---|---|
| $R_1=41.782$ | $d_1=7.51$ | 1.523/59.5 |
| $R'_1=-42.684$ | $a_1=0.25$ | |
| $R_2=+27.037$ | $d_2=9.012$ | 1.60738/56.65 |
| $R'_2=-64.063$ | $a_2=0$ | |
| $R_3=-64.063$ | $d_3=2.692$ | 1.62004/36.37 |
| $R'_3=+38.803$ | $b=10.00$ | |

In correspondence with relationship (a)–(e):
a. $1.0 f > |R'_1+R_1| = 0,845 f > 0,60 f$
b. $C \leq |R'_1-R_1| = 0,00902 f < 0,15 f$
c. $1.10 < |R_1 : R_2| = 1,545 < 2,10$
d. $2,5 \Phi \varphi_a = 3.472 \Phi < 4,0$
e. $0,05 f < d_1 = 0,0751 f < 0,20 f$
   $\varphi a = \varphi'_1 + \varphi_2$

EXAMPLE 2 (FIG. 1)

| Radius | $f=100$ mm Thickness and Air Distance | Aperture 1:8 nd/$v$ |
|---|---|---|
| $R_1=38.373$ | $d_1=12.11$ | 1.52249/59.48 |
| $R'_1=-39.249$ | $a_1=0.61$ | |
| $R_2=+30.004$ | $d_2=11.34$ | 1.60729/49.40 |
| $R'_2=-25.430$ | $a_2=0$ | |
| $R_3=-25.430$ | $d_3=5.75$ | 1.62004/36.37 / 36.37 |
| $R'_3=+40.729$ | $b=9.65$ | |

In correspondence with relationship (a)–(e):
a. $1.0 F > |R'_1+R_1| = 0,766 f > 0,60 f$
b. $0 \leq |R'_1-R_1| = 0,00876 f < 0,15 f$
c. $1,10 < |R_1 : R_2| = 1,279 < 2,10$
d. $2,5 \Phi < \varphi_a = 3,355 \Phi < 4,0 \Phi$
e. $0,05 f < d_1 = 0,12 f < 0,20 f$
   $\varphi_a = \varphi'_1 + \varphi_2$

What is claimed is:

1. In a photographic objective, having a front end directed toward the side of the longer conjugate and a rear end directed toward the side of the shorter conjugate, a rear diaphragm, and a pair of meniscus-shaped components situated along the optical axis in front of said diaphragm, said components respectively having convex exterior surfaces directed toward each other and one of said components being composed of two individual lenses one of which is positive and the other of which is negative, the other of said components including a single lens which together with said two lenses of said component form an objective of three lenses and said three lenses providing the objective with biconcave configuration, and said components conforming to the following for an equivalent focal length equal to 100 mm.:

| Radius | Thickness and Air Distance | nd/$v$ |
|---|---|---|
| $R_1=41.782$ | $d_1=7.51$ | 1.523/59.5 |
| $R'_1=-42.684$ | $a_1=0.25$ | |
| $R_2=+27.037$ | $d_2=9.012$ | 1.60738/56.65 |
| $R'_2=-64.063$ | $a_2=0$ | |
| $R_3=-64.063$ | $d_3=2.629$ | 1.62004/36.37 |
| $R'_3=+38.803$ | $b=10.00$ | |

2. In a photographic objective, having a front end directed toward the side of the longer conjugate and a rear end directed toward the side of the shorter conjugate, a rear diaphragm, and a pair of meniscus-shpaped components situated along the optical axis in front of said diaphragm, said components respectively having convex exterior surfaces directed toward each other and one of said components being composed of two individual lenses one of which is positive and the other of which is negative, the other of said components including a single lens which together with said two lenses of said component form an objective of three lenses and said three lenses providing the objective with biconcave configuration, and said components conforming to the following for an equivalent focal length equal to 100 mm.:

| Radius | Thickness and Air Distance | nd/$v$ |
|---|---|---|
| $R_1=-38.373$ | $d_1=12.11$ | 1.52249/59.48 |
| $R'_1=-39.249$ | $a_1=0.61$ | |
| $R_2=+30.004$ | $d_2=11.34$ | 1.60729/49.40 |
| $R'_2=-25.430$ | $a_2=0$ | |
| $R_3=-25.430$ | $d_3=5.75$ | 1.62004/36.37 |
| $R'_3=-40.729$ | $b=9.65$ | |